(12) United States Patent
Brzezinski et al.

(10) Patent No.: US 11,421,728 B2
(45) Date of Patent: Aug. 23, 2022

(54) STEERING SHAFT ASSEMBLY HAVING ANTI-PULL APART FEATURE

(71) Applicant: Steering Solutions IP Holding Corporation, Saginaw, MI (US)

(72) Inventors: Gregory D. Brzezinski, Freeland, MI (US); Benjamin J. Kolhagen, Frankenmuth, MI (US); Harold J. Nelson, Standish, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 16/827,249

(22) Filed: Mar. 23, 2020

(65) Prior Publication Data

US 2020/0224712 A1 Jul. 16, 2020

Related U.S. Application Data

(62) Division of application No. 15/478,650, filed on Apr. 4, 2017, now Pat. No. 10,641,315.

(51) Int. Cl.
| | |
|---|---|
| *F16C 3/03* | (2006.01) |
| *B62D 1/16* | (2006.01) |
| *B23P 11/00* | (2006.01) |
| *B62D 1/20* | (2006.01) |
| *F16D 3/06* | (2006.01) |

(52) U.S. Cl.
CPC ............. *F16C 3/03* (2013.01); *B23P 11/00* (2013.01); *B62D 1/16* (2013.01); *B62D 1/20* (2013.01); *F16D 3/06* (2013.01)

(58) Field of Classification Search
CPC . B62D 1/08; B62D 1/085; B62D 1/16; B62D 1/18; B62D 1/20; F16D 2300/12; F16D 1/04; F16D 3/06; Y10T 403/7077; G05G 5/06; G05G 5/08
USPC ........ 403/377; 464/149, 150, 157, 158, 162, 464/172; 74/493, 527
See application file for complete search history.

(56) References Cited

U.S. PATENT DOCUMENTS

| | | | | |
|---|---|---|---|---|
| 4,723,429 A * | 2/1988 | Weber | ................. | B30B 15/0094 100/99 |
| 4,918,956 A * | 4/1990 | Schoch | ................. | B21D 51/383 72/21.1 |
| 5,941,117 A * | 8/1999 | Butcher | ................. | B21D 37/16 72/342.7 |
| 6,241,616 B1 * | 6/2001 | Lightcap | ................. | F16C 3/03 464/162 |
| 7,322,607 B2 * | 1/2008 | Yamada | ................. | B62D 1/16 280/755 |
| 9,157,482 B2 * | 10/2015 | Vasicek | ................. | B62D 1/20 |
| 2011/0030496 A1 * | 2/2011 | Tokioka | ................. | F16C 3/035 74/492 |
| 2011/0034256 A1 * | 2/2011 | Tokioka | ................. | B62D 1/185 464/162 |
| 2016/0207559 A1 * | 7/2016 | Braun | ................. | F16C 3/026 |

(Continued)

*Primary Examiner* — Joshua T Kennedy
(74) *Attorney, Agent, or Firm* — Dickinson Wright PLLC

(57) ABSTRACT

A method of manufacturing a steering shaft assembly includes inserting an inner shaft into an outer shaft along a longitudinal axis. The method further includes placing the inner shaft and the outer shaft into a tool having a staking tool provided with a staking feature; aligning a stake with a base of a tooth of the plurality of fine teeth of the outer shaft; and pressing the stake axially into an outer shaft first end to a predetermined depth using the staking feature.

2 Claims, 3 Drawing Sheets

(56) References Cited

U.S. PATENT DOCUMENTS

| 2019/0145456 A1* | 5/2019 | Mark | B62D 1/16 |
| | | | 464/162 |
| 2019/0161111 A1* | 5/2019 | Kondo | B62D 5/0448 |
| 2019/0176869 A1* | 6/2019 | Breuer | B62D 1/185 |

* cited by examiner

STEERING SHAFT ASSEMBLY HAVING ANTI-PULL APART FEATURE

CROSS-REFERENCE TO RELATED APPLICATION

This application is a divisional application of U.S. patent application Ser. No. 15/478,650, filed Apr. 4, 2017, the disclosure of which is incorporated by reference herein in its entirety.

BACKGROUND

A steering column assembly may include a shaft assembly having at least one shaft that is received within another shaft. Angled stakes are formed on at least one of the shafts of the shaft assembly to prevent one of the shafts from being removed from the other. The angled stakes may create an interference condition that may increase stroke efforts and increase drag.

Accordingly, it is desirable to a stake that inhibits the interference condition and does not affect stroke efforts.

SUMMARY

According to an embodiment of the present disclosure, a steering shaft assembly is provided. The steering shaft assembly includes an outer shaft, an inner shaft, and a stake. The outer shaft has an outer shaft internal surface and an outer shaft external surface extending between an outer shaft first end and an outer shaft second end. The outer shaft internal surface defines an internally splined portion having a plurality of fine teeth that extend from the outer shaft first end towards the outer shaft second end. The inner shaft is at least partially received within the outer shaft along a longitudinal axis. The inner shaft has an inner shaft external surface extending between an inner shaft first end and an inner shaft second end. The stake axially extends into the outer shaft first end. The stake is spaced apart from the inner shaft as the inner shaft moves relative to the outer shaft and is arranged to resist a predetermined axial separation load being applied to the outer shaft and the inner shaft.

According to another embodiment of the present disclosure, a method of manufacturing a steering shaft assembly is provided. The method includes inserting an inner shaft having an inner shaft external surface at least partially into an outer shaft having an outer shaft internal surface provided with a plurality of fine teeth along a longitudinal axis. The method further includes placing the inner shaft and the outer shaft into a tool having a staking tool provided with a staking feature; aligning a stake with a base of a tooth of the plurality of fine teeth of the outer shaft; and pressing the stake axially into an outer shaft first end to a predetermined depth using the staking feature.

According to yet another embodiment of the present disclosure, a steering shaft assembly including an outer shaft having an outer shaft internal surface provided with a plurality of fine teeth and an inner shaft configured to be inserted into the outer shaft, is provided. The steering shaft assembly is assembled by a method includes placing the outer shaft into a tool having a staking tool provided with a staking feature and a bottoming feature. The method further includes aligning a stake with an outer shaft first end proximate a base of a tooth of the plurality of fine teeth; and pressing a stake axially into the outer shaft first end to a predetermined depth using the staking feature.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
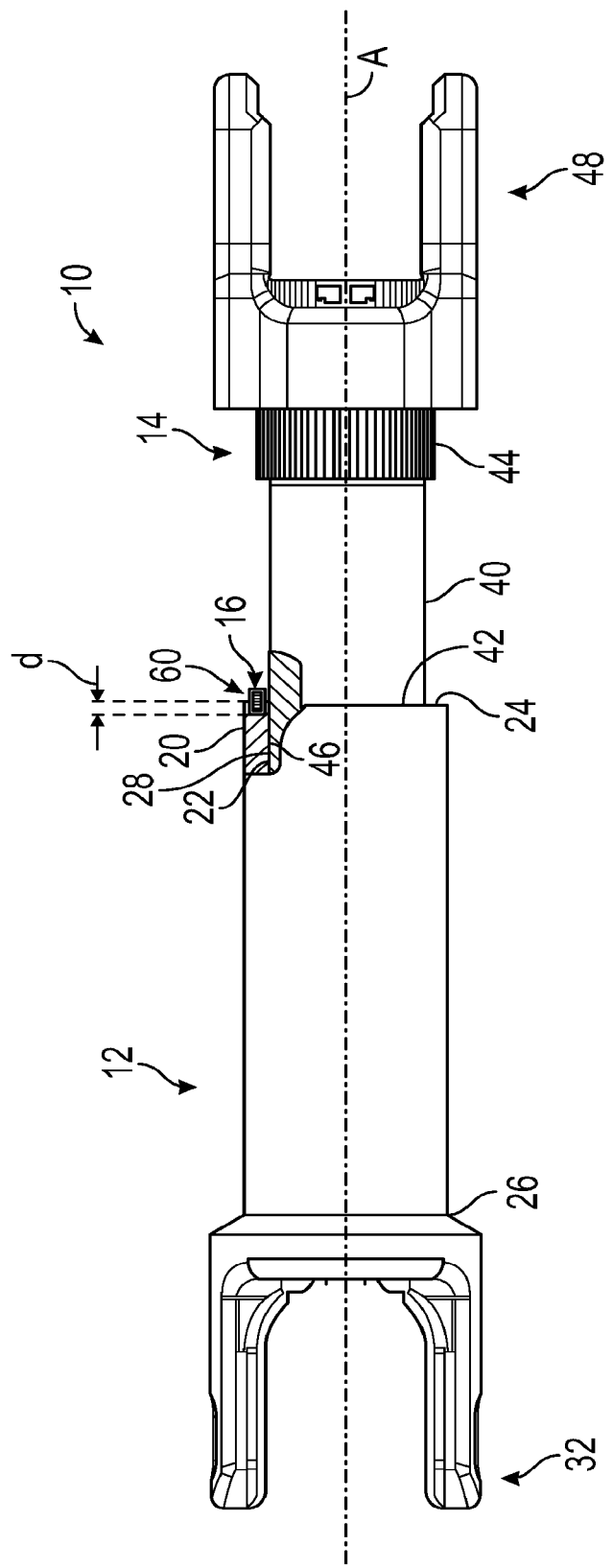
FIG. 1 is a side view of a steering shaft assembly.
Figure 2:
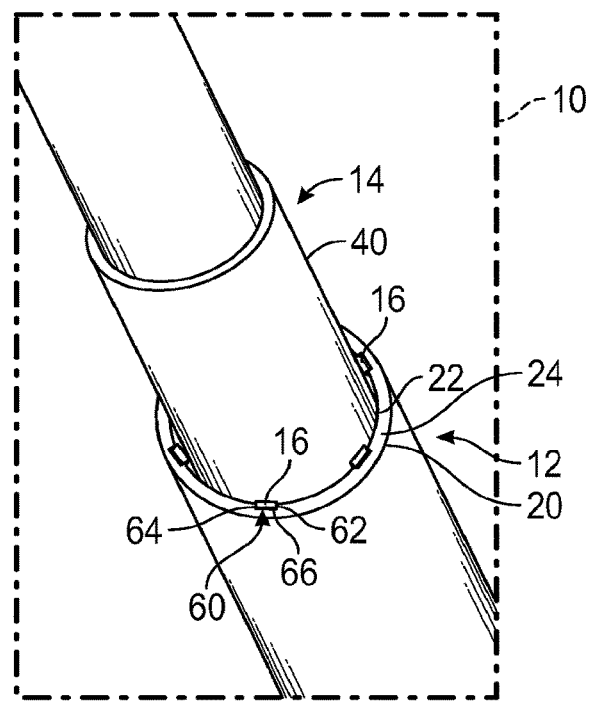
FIG. 2 is a partial perspective view of the steering shaft assembly.

Referring to FIGS. 1 and 2, a steering shaft assembly 10 includes an outer shaft 12, an inner shaft 14, and a stake 16.

The outer shaft 12 is a generally tubular body having an outer shaft external surface 20 disposed opposite an outer shaft internal surface 22. The outer shaft external surface 20 and the outer shaft internal surface 22 each extend between an outer shaft first end 24 and an outer shaft second end 26 is disposed opposite the outer shaft first end 24.

Figure 3:
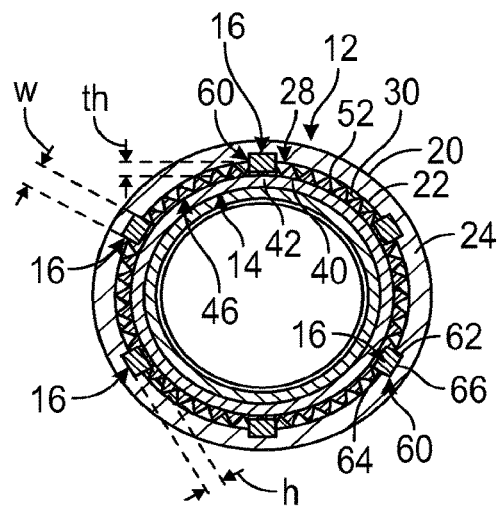
FIG. 3 is an end view of steering shaft assembly.

The outer shaft internal surface 22 defines an internally splined portion 28 that extends from the outer shaft first end 24 towards the outer shaft second end 26. The internally splined portion 28 includes a plurality of fine teeth 30 having a tooth height, th, measured from a base of the tooth to the tip of the tooth being less than 1 mm, as shown in FIG. 3.

The outer shaft second end 26 includes a yoke or an attachment member 32 that is arranged to connect the outer shaft second end 26 of the outer shaft 12 to other components of a steering assembly.

Figure 4:
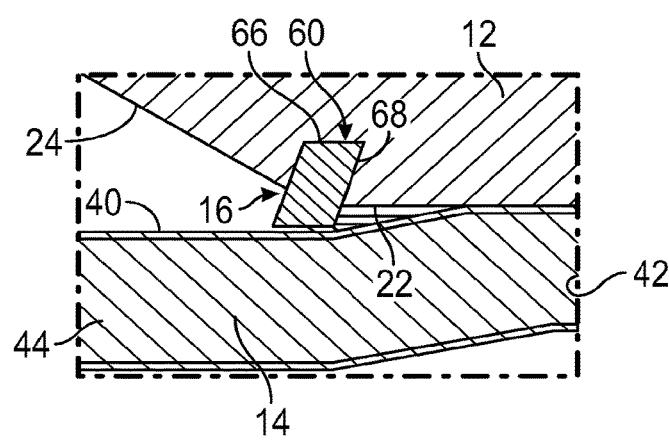
FIG. 4 is a partial section view of a portion of the steering shaft assembly.

The inner shaft 14 may be a solid shaft or a hollow shaft having an inner shaft external surface 40 that extends between an inner shaft first end 42 and an inner shaft second end 44. The inner shaft first end 42 may have a first diameter and the inner shaft second end 44 may have a second diameter that is less than the first diameter such that the inner shaft first end 42 may be flared relative to the inner shaft second end 44, as shown in FIG. 4.

The inner shaft external surface 40 defines an externally splined portion 46 that extends from the inner shaft first end 42 towards the inner shaft second end 44. The externally splined portion 46 includes a plurality of teeth that may be fine teeth (having a tooth height measured between a base of the tooth and a tip of the tooth being less than or equal to 1 mm) or maybe course teeth (having a tooth height measured between a base of the tooth and a tip of the tooth being greater than 1 mm). The inner shaft second end 44 includes another yoke or another attachment member 48 that is arranged to connect the inner shaft second end 44 of the inner shaft 14 to other components of the steering assembly.

The inner shaft 14 is at least partially received within the outer shaft 12 along a longitudinal axis, A. The inner shaft 14 is arranged to telescope along the longitudinal axis A relative to the outer shaft 12 and is arranged to rotate with the outer shaft 12. The inner shaft first end 42 is at least partially received by the outer shaft first end 24 such that the externally splined portion 46 of the inner shaft 14 engages with the internally splined portion 28 of the outer shaft 12.

Referring to FIGS. 1 and 2, the stake 16 axially extends into the outer shaft first end 24 and axially extends towards the outer shaft second end 26. The stake 16 extends at least partially through the outer shaft internal surface 22 and radially extends towards the outer shaft external surface 20. The stake 16 is radially disposed closer to the outer shaft internal surface 22 and the outer shaft external surface 20. The stake 16 radially extends beyond the outer shaft internal surface 22 towards the inner shaft 14.

The stake 16 axially extends a predetermined depth, d, into the outer shaft 12. The predetermined depth, d, is equal to a distance between a tip of a staking tool and a bottoming feature of the staking tool. The stake 16 is disposed substantially flush with the outer shaft first end 24, as shown in FIG. 2. In at least one embodiment, the stake 16 axially extends into the outer shaft first end 24 such that the stake 16 is axially disposed below the outer shaft first end 24. In other words, the stake 16 does not axially extend beyond the outer shaft first end 24 in a direction that extends from the outer shaft second end 26 towards the outer shaft first end 24.

Referring to FIGS. 2 and 3, the stake 16 is provided with a substantially rectangular cross-section, however the stake 16 may be provided with any cross-sectional shape capable of spanning a tooth of the plurality of fine teeth 30 and a space 52 between adjacent teeth of the plurality of fine teeth 30, at a minimum. The rectangular cross-section of the stake 16 has a width, w, and a height, h. In at least one embodiment, the width, w, of the stake 16 may be greater than the height, h. In at least one embodiment, the width, w, of the stake 16 may be substantially equal to the height, h, of the stake 16.

The stake 16 spans or extends across a width of a tooth of the plurality of fine teeth 30 and a space 52 defined between adjacent teeth of the plurality of fine teeth 30. In at least one embodiment, the stake 16 is disposed between adjacent teeth of the plurality of fine teeth 30.

The stake 16 is substantially rectangular and extends into a rectangular pocket 60 defined within the outer shaft 12. The rectangular pocket 60 as an open ended pocket that opens towards the inner shaft external surface 40. The stake 16 extends through the open end of the rectangular pocket 60 towards the inner shaft external surface 40.

Referring to FIGS. 2, 3, and 4 rectangular pocket 60 includes a first wall 62, a second wall 64, a third wall 66, and a fourth wall 68. The first wall 62 and the second wall 64 radially extend from the outer shaft internal surface 22 towards the outer shaft external surface 20. The first wall 62 and the second wall 64 axially extend from the outer shaft first end 24 towards the outer shaft second end 26. The third wall 66 extends between ends of the first wall 62 and the second wall 64. The third wall 66 is radially disposed between the outer shaft internal surface 22 and the outer shaft external surface 20. The fourth wall 68 is axially spaced apart from the outer shaft first end 24 the predetermined depth, d. The fourth wall 68 extends between the first wall 62, the second wall 64, and the third wall 66.

The stake 16 is arranged to resist a predetermined axial separation load being applied to at least one of the outer shaft 12 and the inner shaft 14, such that the stake 16 is an anti-pull apart feature for the steering shaft assembly 10. For example, while the steering shaft assembly 10 is in a fully extended position, as shown in FIG. 4, the stake 16 may interfere with the splined portion of the inner shaft first end 42 to inhibit or resist the inner shaft 14 from being separated or pulled apart from the outer shaft 12 until the predetermined axial separation load is met.

The stake 16 is axially staked while minimizing axial distortion from the stake 16 down the length of the outer shaft 12. The minimized axial distortion inhibits the stake 16 from engaging the inner shaft external surface 40 such that the stake 16 is spaced apart from the inner shaft 14 as the inner shaft 14 moves relative to the outer shaft 12 during telescope operation of the steering shaft assembly 10.

Figure 5:
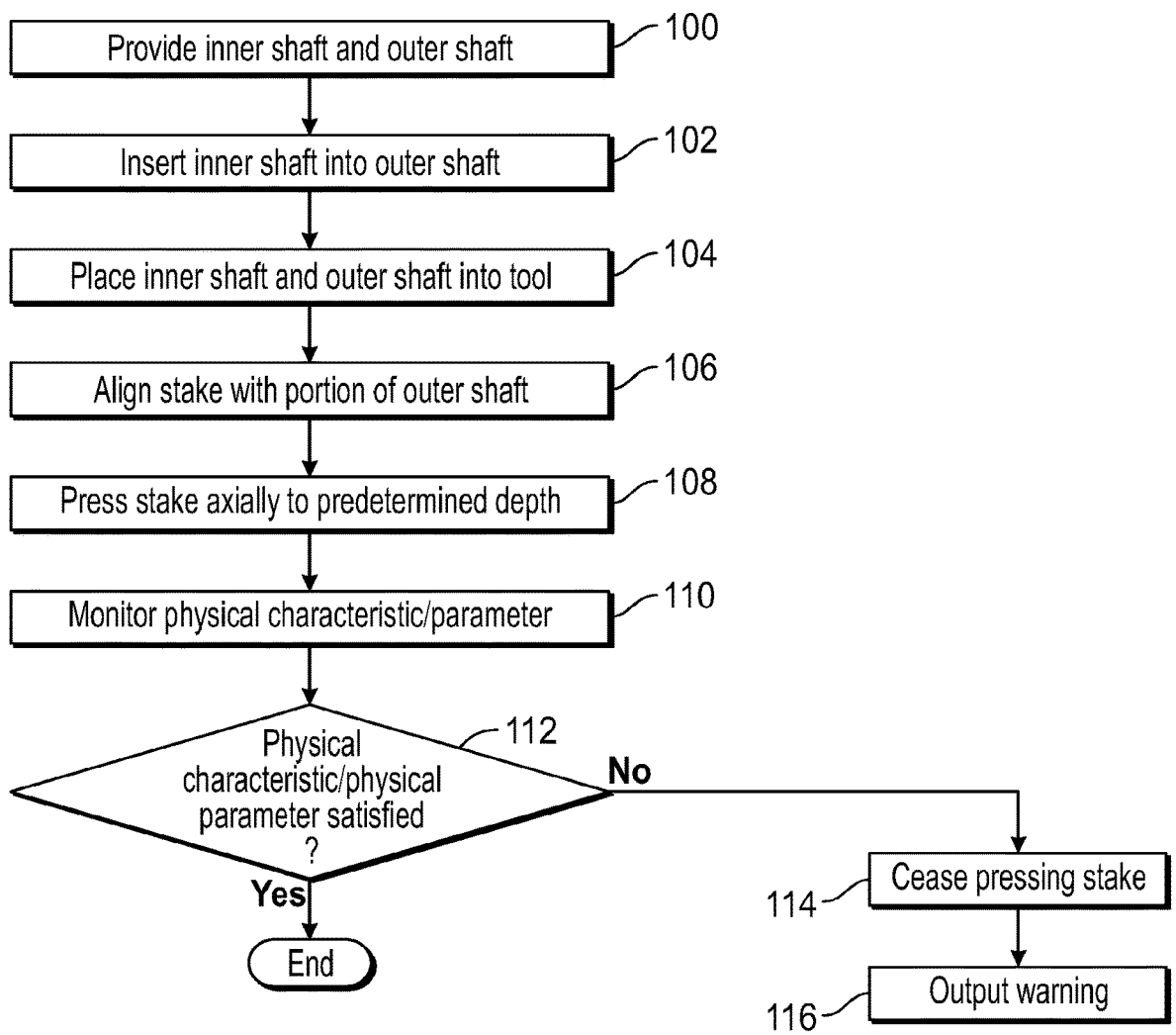
FIG. 5 is an illustrative method of manufacturing or assembling a steering shaft assembly.

Referring to FIG. 5, an illustrative method of manufacturing or assembling the steering shaft assembly 10 to control the axial staking of the stake 16 to inhibit the stake 16 from contacting the inner shaft 14 using a staking tool having a staking feature in a bottoming feature.

At block 100, the outer shaft 12 and the inner shaft 14 are provided. At block 102, the inner shaft 14 is inserted within or into the outer shaft 12.

At block 104, the inner shaft 14 and outer shaft 12 are placed into a tool, such as a die pot, having a staking tool and a bottoming feature. The staking tool is configured as a punch or a pin that presses the stake 16 into the outer shaft first end 24 at least until a bottoming feature engages the outer shaft first end 24 when the predetermined depth, d, is achieved and distributes the load of the tool being applied.

At block 106, the stake 16 is aligned with a portion of the outer shaft 12 such as at least one of a base of a tooth of the plurality of fine teeth 30 or a space 52 disposed between adjacent teeth of the plurality of fine teeth 30. At block 108, the tool axially presses the stake 16 using the staking tool towards the predetermined depth, d.

At block 110, the method monitors a plurality of physical characteristics or physical parameters related to the pressing of the stake 16 into the outer shaft 12. The plurality of physical characteristics or physical parameters monitored by the method may include: a displacement of the stake 16 towards the predetermined depth, an overload force or a press load, engagement of the bottoming feature with the outer shaft first end 24, and a press load rate of change.

Monitoring the total displacement of the stake 16 into the outer shaft 12 relative to the outer shaft first end 24, enables the method to determine if the stake 16 is damaged; the staking tool is damaged or worn out, or over pressing/driving the stake 16 into the outer shaft 12 to inhibit distorting of the outer shaft 12.

Monitoring the press load applied by the tool enables the method to determine if the stake 16 may be over-pressed or under-pressed. The method determines if the press load is within an acceptable range or does not exceed a threshold press load to ensure that the stake 16 is adequately pressed to the predetermined depth, d. In at least one embodiment, the method monitors if an overload force has been applied by the tool. An overload force may be a force greater than the threshold press load that may lead to over-pressing of the stake 16. In response, to a press load force being greater than the threshold press load, the method may cease pressing the stake 16.

Monitoring engagement of the bottoming feature with the outer shaft first end 24 enables the method to determine if the stake 16 has been pressed to the predetermined depth, d, and/or to inhibit the tool from further pressing the stake 16. The bottoming feature engages the outer shaft first end 24 if the displacement of the stake 16 is equal to the predetermined depth, d or if the displacement of the stake 16 is not equal to the predetermined depth, d, the stake may be damaged, the staking tool may need replacement, or an error with the tool. In response to the bottoming feature engaging the outer shaft first end 24 and the displacement of the stake 16 not being equal to the predetermined depth, d, the method may cease pressing the stake 16.

Monitoring a press load rate of change enables the method to determine if the load being applied by the tool increases sharply without the stake 16 achieving the predetermined depth, d. The press load rate of change being greater than a threshold rate of change may be indicative of a stake 16 being absent, a misalignment between the stake 16 and the staking tool, or a damaged stake 16. In response to the press load rate of change being greater than a threshold press load rate of change, the method may cease pressing the stake 16.

At block 112, the method determines if the predetermined depth of the stake 16 has been reached, an overload force has not been exceeded, the bottoming feature engages the outer shaft first end 24, the press load is within an acceptable range, and a press load rate of change is within an acceptable range. In response to all of the above mentioned physical characteristics or physical parameters being satisfied (e.g. the stake 16 reaching the predetermined depth, engagement between the bottoming feature and the outer shaft first end 24, the press load being within a predetermined press load range, and the press load rate of change being within a predetermined press load rate of change range), the stake 16 is acceptable and the method may cease pressing the stake 16. In response to at least one of the above mentioned physical characteristics or physical parameters not being satisfied (e.g. the stake 16 not reaching the predetermined depth and engagement between the bottoming feature and the outer shaft first end 24, the press load not being within a predetermined press load range, and the press load rate of change not being within a predetermined press load rate of change range), the method continues to block 114.

At block 114, the method ceases pressing the stake and at block 116, a warning is output for display indicative of the specific physical characteristic or physical parameter that has not been satisfied.

While the present disclosure has been described in detail in connection with only a limited number of embodiments, it should be readily understood that the present disclosure is not limited to such disclosed embodiments. Rather, the invention can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments or various combinations of the described embodiments. Accordingly, the present disclosure is not to be seen as limited by the foregoing description.

Having thus described the invention, it is claimed:

1. A method of manufacturing a steering shaft assembly, comprising:
    inserting an inner shaft having an inner shaft external surface at least partially into an outer shaft having an outer shaft internal surface provided with a plurality of fine teeth along a longitudinal axis, wherein at least a portion of the inner shaft external surface has external splines formed thereon;
    placing the inner shaft and the outer shaft into a tool having a staking tool provided with a staking feature;
    aligning a stake with a base of a tooth of the plurality of fine teeth of the outer shaft and spanning the stake across an entire width of the tooth of the plurality of fine teeth and a space defined between a crest of the tooth and a crest of an adjacent tooth of the plurality of fine teeth;
    pressing the stake axially into an outer shaft first end to a predetermined depth using the staking feature;
    monitoring a press load applied to the stake; and
    monitoring a total displacement of the stake relative to the outer shaft, wherein in response to a press load rate of change greater than a threshold rate of change, ceasing pressing the stake axially.

2. The method of claim 1, wherein in response to the press load being at least a threshold press load and the total displacement being less than predetermined depth, outputting a warning for display.

* * * * *